United States Patent

Ban

[15] 3,638,952

[45] Feb. 1, 1972

[54] TAPE DRIVE SPEED CHANGING APPARATUS

[72] Inventor: Itsuki Ban, 829, Higashi-Oizumimachi, Nerimu-ku, Tokyo, Japan

[22] Filed: Apr. 15, 1970

[21] Appl. No.: 28,599

[30] Foreign Application Priority Data

Apr. 17, 1969 Japan....................................44/34690

[52] U.S. Cl...............................274/4 D, 64/30 R, 74/242.3, 179/100.2 S, 179/100.1 VC, 226/40, 226/178

[51] Int. Cl.....................................G11b 15/29, G11b 15/44

[58] Field of Search................226/40, 178, 41; 179/100.2 Z, 179/100.2 VC, 100.2 S; 74/242.3; 64/30 R; 274/4 D, 4 E, 4 F, 4 B, 11 B, 11 E

[56] References Cited

UNITED STATES PATENTS

| | | | |
|---|---|---|---|
| 2,396,409 | 3/1946 | Berzer | 179/100.2 S |
| 2,536,666 | 1/1951 | Somers | 179/100.1 VC |
| 3,037,088 | 5/1962 | Berger | 226/178 |
| 2,898,409 | 8/1959 | Tiger | 179/100.2 Z |
| 2,986,318 | 5/1961 | Tiger | 226/178 |
| 3,248,961 | 5/1966 | Bortzfield | 74/242.3 |
| 3,303,711 | 2/1967 | Karecki | 74/242.3 |
| 3,319,858 | 5/1967 | Schober | 226/178 |

*Primary Examiner*—Leonard Forman
*Assistant Examiner*—Dennis A. Dearing
*Attorney*—Jacobs & Jacobs

[57] ABSTRACT

A tape drive speed changing apparatus for a magnetic tape player, comprising a motor attaining high or low speed, small and large drive pulleys connected to the output shaft of the motor, a flywheel attached to capstan for driving a magnetic tape, a belt normally trained between the small drive pulley and the flywheel, shift means moving the belt to the position where the belt is shifted from the small drive pulley to the large drive pulley, a changing switch actuated by the shift means to change over the rotational speed of the motor from low to high, lock means locking the shift means in the condition that the belt is moved to the position where the belt is trained to the large drive pulley, and control means controlling operation of the lock means whereby the magnetic tape may be rotated at normal playing speed or fast speed in relation to operation of the shift means.

7 Claims, 6 Drawing Figures

TAPE DRIVE SPEED CHANGING APPARATUS

BACKGROUND OF THE INVENTION

This invention relates to a tape drive speed changing apparatus for a magnetic tape player.

In the magnetic tape player, it has been generally practiced to fast-feed the magnetic tape to such a extent that the reproduction with respect to the tape is not required. Where the tape is fast-fed, it is customary to increase rotational speed of the capstan for driving the tape in case of players utilizing an endless magnetic tape cartridge. In general, the tape is fed at speed four times as fast as normal playing speed. In order to change rotational speed of the capstan, the output shaft of the motor is provided with two of large and small drive pulleys between which and a flywheel attached to the capstan a belt is shifted from one to the other. This has been considered preferable in economical and mechanical points. However, difficulty has been experienced in employing the way as mentioned above. For instance, the rotational speed of the capstan may be increased twice as fast as before. If the capstan is intended to rotate at speed four times as fast as normal speed, it is required to provide the ratio of the diameter of two large and small drive pulley is 4:1. Accordingly, where the belt is trained between the large drive pulley and the flywheel, the belt is expanded due to more tension as compared with the belt being trained between the small drive pulley and the flywheel. In this instance, the coefficient of expansion of the belt is about 20 percent. As the belt is maintained expanded, the capstan is continuously driven to hasten deterioration of the belt and be of no use. From this it is apparent that allowance for increment of tape drive speed may be twice from the durability point of view as to the belt when the belt is shifted. Even if the tape is driven at speed twice as fast as before, it is not satisfactory to practical use.

On the other hand, there is a way for changing the rotational speed of the motor as alternative means to change the rotational speed of the capstan. As for example, a governor which controls the current applied to the motor is adapted to be in nonoperative condition to allow the output shaft of the motor to rotate at a predetermined standard speed so that the current is constantly applied to the motor. To bring the governor in nonoperative condition increases, in theory, the rotational speed of the output shaft of the motor more than twice as compared with the standard speed, however, problems are involved in practical use due to reduction of efficiency, deterioration of the governor, and damage of the commutator derived from friction with the brush in case of the standard speed. For all that, it is not enough to double the rotational speed of the motor since the rotational speed of the tape is too slow to feed the tape at ideal fast speed.

The inventor has succeeded in obtaining a tape drive speed changing apparatus simply arranged so that the rotational speed of the capstan is increased to the extent suitable for fast feeding of the tape by changing the rotational speed of the motor upon shifting the belt in the manner as mentioned hereinbefore.

SUMMARY OF THE INVENTION

It is a primary object of the invention to provide a tape drive speed changing apparatus for a magnetic tape player, wherein rotation of a capstan for driving a magnetic tape is changed over from high speed to low speed or vice versa to selectively feed the tape at high or low speed.

Another object of the invention is to provide a tape drive speed changing apparatus for a magnetic tape player, wherein a motor for driving a capstan is used by which high or low rotational speed may be obtained, and rotation of small and large drive pulleys connected to the output shaft is selectively transferred through a belt, a flywheel attached to the capstan to the latter, the motor and capstan being rotated at low speed when the belt is trained to the small drive pulley, or at high speed when the belt is trained to the large drive pulley whereby the magnetic tape is selectively fed at normal or fast speed.

A further object of the invention is to provide a tape drive speed changing apparatus for a magnetic tape player, comprising shift means moving the belt to selectively shift the belt with respect to the small or large drive pulley, and lock means locking the shift means in the condition that the belt is trained to the flywheel.

Another object of the invention is to provide a tape drive speed changing apparatus for a magnetic tape player, wherein a changing switch for changing the rotational speed is actuated when the shift means is locked by the lock means, to change rotation of the motor to high speed to fast-feed the magnetic tape.

Yet another object of the invention is to provide a tape drive speed changing apparatus for a magnetic tape player, wherein the lock means is disengaged from the shift means in response to the pass of the nonrecorded zone between one recorded zone and the next recorded zone on the tape through a magnetic head whereby the shift means is returned to the condition in which the belt is shifted to the small drive pulley and the fast-feed of the tape is automatically completed in response to the nonrecorded zone on the tape to change the tape at normal feed.

As the invention is embodied in the magnetic tape player utilizing the endless magnetic tape cartridge, efficiency of the player may be improved.

These and other objects of the invention will be apparent from the following description and accompanying drawing in which:

BRIEF DESCRIPTION OF THE DRAWINGS

FIGS. 4A and 4B are an exploded perspective view and side view, respectively showing means connecting the pulleys to the output shaft of the motor.

DESCRIPTION OF THE PREFERRED EMBODIMENTS

Figure 1:
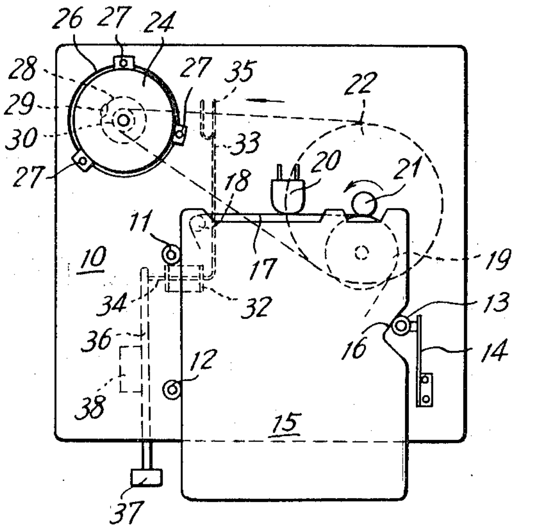
FIG. 1 is a plan view of a magnetic tape player to which one embodiment of an apparatus of the invention is applied.

Referring now to the drawings, and in particularly to FIG. 1, the reference numeral 10 designates a horizontal deck within a housing for an endless magnetic tape cartridge player. A way is provided on the deck 10 for an endless magnetic tape cartridge 15 and guide members 11, 12 and 13 are mounted on the deck to hold the cartridge in the operative position. The guide member 13 is mounted on a leaf spring 14 one end of which is mounted to the deck 10 and is pressed into a notch 16 on the one side of the cartridge 15. When the guide member 13 is caused to press the inclined wall of the notch 16 in the cartridge, the cartridge 15 is exerted by a forward force and then is brought to the operative position with respect to a magnetic head 20 and a capstan 21.

The cartridge 15 includes a generally rectangular housing with a centrally disposed reel (not shown) on which an endless magnetic tape 17 is wound and unwound in conventional manner. The tape 17 passes over a guide 18 and pinch roller 19. The guide 18 and pinch roller 19 are disposed adjacent the leading edge of the cartridge 15 whereat the cartridge sidewall is cut away or dispensed with and the tape 17 is extended from the center of the hub of the reel (not shown) about the guide 18 and thence about the pinch roller 19 back to outer periphery of a roll formed by the tape wound about the hub.

The capstan 21 is rotatably mounted by a suitable bearing (not shown) downwardly of the deck 10 and upwardly extends form the deck through a hole (not shown) bored therethrough. The capstan 21 is adapted to cooperate with the pinch roller 19 of the cartridge 15 when the cartridge is urged into its operating position. The capstan 21 may be driven at either of two different speeds with the apparatus in accordance with this invention. A flywheel 22 is attached to the capstan 21 at the lower end thereof.

Figure 2:
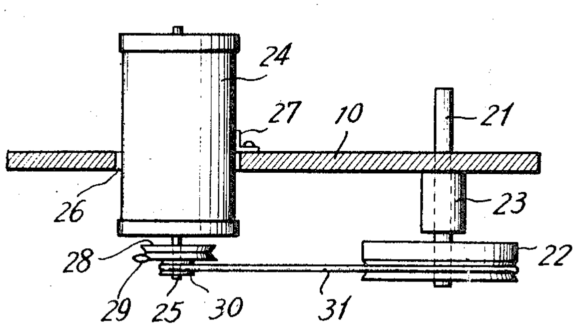
FIG. 2 is a front view of a mechanical portion for imparting rotation of the output shaft of the motor of FIG. 1 to the capstan.

As clearly shown in FIG. 2, a motor 24 for rotatably driving the capstan 21 extends through a hole 26 formed in the deck 10 and is mounted on the deck 10 by means of brackets 27. An output shaft 25 of the motor 24 extends from the motor body downwardly of the deck 10 and is provided with a large drive pulley 28 and a small drive pulley 30. The large drive pulley 28 has a flange 29 at the periphery thereof.

A belt 31 of resilient material such as rubber or the like is normally trained between the small drive pulley 30 and the flywheel 22. Thus, rotation of the motor 24 and the output shaft 25 is imparted through the small drive pulley 30, the belt 31, and the flywheel 22 to the capstan 21. The capstan is normally rotated at low speed thereby driving the magnetic tape 17 at a predetermined playing drive speed.

Figure 3:
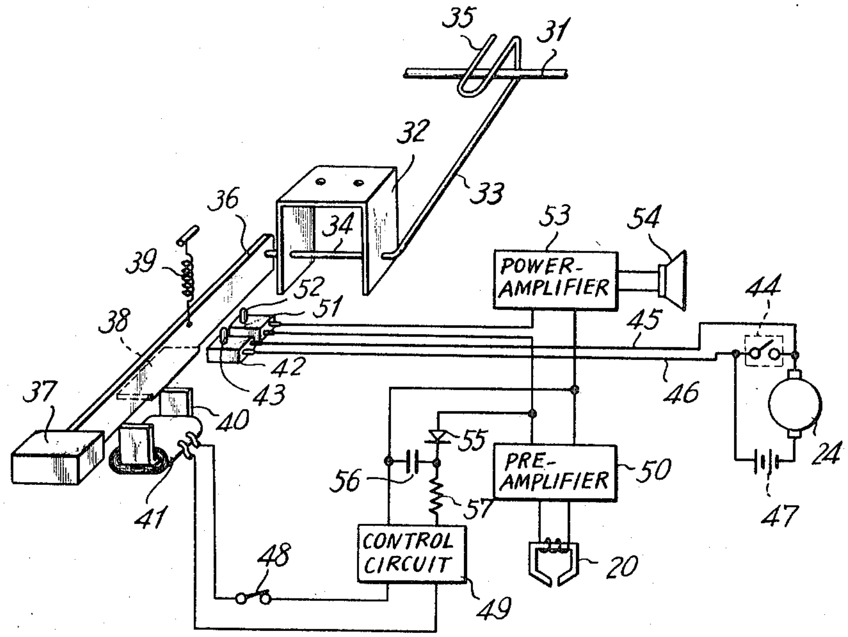
FIG. 3 is a representation showing a mechanism by which the belt shown in FIGS. 1 and 2 is selectively trained to the small or large drive pulley to change the rotational speed of the motor.
Figure 3:
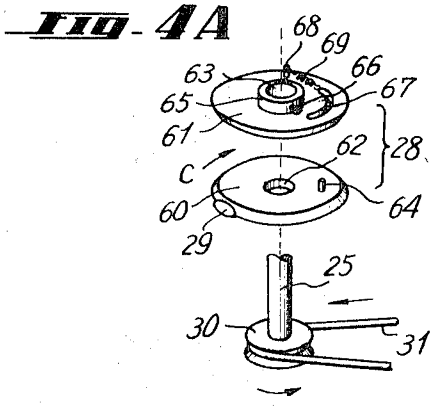

Shift means is provided for moving the belt 31 to selectively engage the belt over the small or the large drive pulley and the details of the shift means will be described hereinafter by reference to FIG. 3.

The shift means includes an actuating member 33 of wire or the like of which one end is rotatably supported by a substantially U-shaped bracket 32 mounted to the deck 10 thereunder. The actuating member 33 has one end portion 34 bent at right angle and rotatably supported by the bracket 32 and the other end portion 35 bent to embrace the belt 31. An operating lever 36 is mounted at its rear end to the actuating lever 33 at the end portion 34 at the tip end thereof and is provided with a knob 37 at one end thereof and a bent portion 38 at midportion thereof. The operating lever 36 is upwardly biased by a spring 39. The knob 37 projects from the front panel (not shown) of the tape player housing (not shown) and is adapted to be manually operated. The operating lever 36 is made of magnetic material such as mild steel or the like. When the knob 37 is manually depressed to swing the operating lever 36 about the end portion 34 of the actuating member 33 against the bias of the spring 39, the bent portion 38 is attracted to an electromagnet 40 as lock means immovably mounted within the player housing (not shown). The operating lever 36 is manually swung to the position where it is engaged by the electromagnet 40, and the actuating member 33 is rotated with the lever. This rotation of the actuating member 33 upwardly moves the end portion 35 to raise the belt 31 allowing the belt to engage the flange 34 of the large drive pulley 28 whereby the belt is shifted from the small drive pulley 30 to the large drive pulley. As a result, the rotational speed of the capstan 21 is increased. A normally opened electrical switch 42 is connected in parallel with the governor 44 of the motor 24 through leads 45 and 46 and is closed by an actuator 43 depressedly operable by the lever 36 when the operating lever 36 is locked by the electromagnet 40. The governor 44 is the conventional one consisting of two contacts which are operatively controlled in relation to rotation of the output shaft 25 of the motor 24. The governor 44 is adapted to be opened to cut off the current from a power source 47 to the motor 24 when rotation of the output shaft 25 is in excess of a predetermined speed while being closed to allow the motor 24 to be energized from the power source 47 when rotation of the shaft 25 is made less than predetermined speed. This operation of the governor 44 normally rotates the output shaft 25 at a predetermined standard speed. When the switch 42 is closed by actuation of the operating lever 36, the motor 24 is continuously energized from the power source 47 irrespective of operation of the governor 44. Thus, rotation of the output shaft 25 of the motor 24 is increased. According to the embodiment as shown, the ratio of the diameter of the small and large drive pulleys is adapted to be 1:2, and the motor 24 is made so that the output shaft is rotated at speed about twice as fast as the standard speed when the switch 42 is closed. Therefore, during the time that the operating lever 36 is engaged by the electromagnet 40, the belt 31 is maintained interposed between the large drive pulley 28 and the flywheel 22, and the output shaft 25 is rotated at speed about twice as fast as standard speed so that the capstan 21 is rotated at speed about four times as fast as normal speed to transport the tape 17 at speed about four times as fast as playing speed.

An output terminal of a control circuit 49 is for control means for controlling operation of the magnet. The electromagnet 40 includes a coil 41 connected through a manually operable normally closed switch 48 to the output terminal. The control circuit 49 is constituted so that the output voltage is generated in the output terminal during the time that the electrical signal is applied to the input signal while the output voltage is nil when the electrical signal applied to the input terminal is reduced less than a predetermined level. The control circuit is, as for example, of Schmidt circuit.

The output of the magnetic head 20 adapted to transduce the magnetic tape 17 is applied to a preamplifier 50. The output of the preamplifier 50 is in turn applied through a normally closed electric switch 51 to a power amplifier 53 which drives a speaker 54. The switch 51 is immovably supported within the player housing (not shown) and is opened by depressedly operation of the actuator 52 by the lever when the operating lever 36 is attracted to the electromagnet 40. Therefore, when the tape 17 is fast-fed, the output of the preamplifier 50 is not applied to the power amplifier 53 to thus produce no reproduction sound from the speaker 54. The output of the preamplifier 50 may also be applied to a rectification circuit comprising a diode 55, a condenser 56 and a resistor 57. The output signal, rectified by the rectification circuit, of the preamplifier 50 is applied to the input terminal of the control circuit 49. More specifically, the output signal for the rectification circuit is input electrical signal for the control circuit 49.

During the time that the tape 17 is driven and the recorded zone on the tape passes through the magnetic head 20, the current is drained to the coil 41 of the electromagnet 40 for attracting the operating lever 36 since the rectified reproducing signal is applied to the control circuit 49. On the contrary, when the nonrecorded zone between one recorded zone and a successive recorded zone on the tape 17 passes through the magnetic head 20, the reproducing signal becomes nil so that the output voltage is generated in the output terminal of the control circuit to prevent supply of the current to the coil 41 of the electromagnet 40. As a result, the operating lever 36 is disengaged from attraction with the electromagnet 40 and is then returned to its original position by the bias of the spring 39. With return of the operating lever 35, the actuating member 33 is rotatably returned to its initial position to lower the end portion 35 to downwardly move the belt 31. The downwardly shifted belt 31 is engaged over the small drive pulley 30 leaving away from the large drive pulley 28. Also, with return of the operating lever 35, operation of the switches 42 and 51 are released with the switch 42 being opened and the switch 51 being closed. Upon opening the switch 42, the governor 44 of the motor 24 controls the current from the power source 47 to the motor 24 to reduce the rotational speed the output shaft thereby rotating it at the standard speed. In this manner, rotation of the capstan 21 is made at low speed to complete the tape fast-feed thereby driving the tape 17 at normal playing speed. When the tape 17 is driven at normal playing speed, the reproducing sound is produced from the speaker 54 in relation to closing of the switch 51.

As fully described in the foregoing, the tape 17 is fast transported by depressedly operating the knob 37 and is automatically brought to the normal feed in response to pass of the nonrecorded zone on the tape through the magnetic head 20. If there is the recorded zone undesired to listen on the tape, the knob 37 may be depressed until the next recorded zone on the tape is initially reproduced. When the switch 48 is manually opened in the fast-feed of the tape 17, no current is applied to the coil 41 of the electromagnet 40 to disengage the operating lever 36 whereby the tape 17 is changed from fast-feed to normal feed when desired in relation to manual operation of the switch 48.

An induction motor may be used in substitution for the motor 24 to allow its output shaft to selectively rotate at low or high speed if it is arranged to change from two to four poles by a changing switch which is actuated by the operating lever 36. In this instance, the induction motor is adapted to operate as four poles when the tape 17 is driven at normal playing speed and as two poles when the tape is fed at fast-feed speed.

Figure 4B:
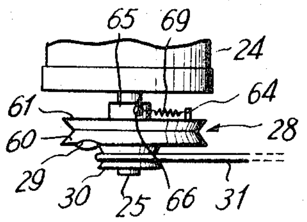

FIGS. 4A and 4B show a mechanism for preventing injury of the belt derived from impact engagement of the belt with the flange 29 of the large drive pulley 28 when the belt 31 is shift from the small drive pulley 25 to the large drive pulley 28. In this figure, similar numerals are used to illustrate like parts in FIGS. 1 and 2. The small drive pulley 30 is firmly mounted to the output shaft 25 of the motor 24 and is rotated in the direction of the arrow as shown. As shown, the belt 31 is trained to the small drive pulley. The large drive pulley 28 is divided into two disk members 60 and 61 defining a belt groove. The disk member 60 is provided with a central hole 62 to receive the output shaft 25 and is rotatably mounted with respect to the output shaft 25. The disk member 60 includes the flange 29 at the periphery thereof and an upwardly extending pin 64 at the face thereof. On the other hand, the disk member 61 has its central hole 63 to receive the output shaft 25 and an upwardly extending sleever 65. The disk member 61 is mounted to the shaft 25 by screw 66 threaded into the sleeve. An arc-shaped slot 67 is formed on the face of the disk member 61 to receive the pin 64 upwardly extending therefrom. A pin 68 is connected to the disk member 61 to allow a spring 69 to be trained to the pins 64 and 68. The disk member 60 is clockwise biased against the disk member 61 by the bias of the spring 69, however, movement of the disk member 60 made by the spring 69 is normally limited by the pin 64 on the disk member 60 in engagement of the slot 67 in the disk member 61. When the belt 31 is upwardly moved by the aforesaid shift means to engage the flange with the belt 31, the disk member 60 is rotated in the direction of the arrow C with respect to the disk member 61 against the bias of the spring 69. Accordingly, the belt 31 is prevented from being injured since impact is reduced which is derived from engagement of the belt with the belt when the belt is engaged over the large drive pulley 28 leaving the small drive pulley 30.

Figure 5:
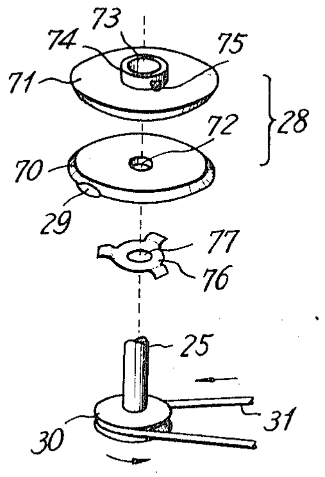
FIG. 5 is an exploded perspective view showing alternative means connecting the pulleys to the output shaft.

FIG. 5 shows alternative mechanism to attain the same purpose as that of the mechanism shown in FIGS. 4A and 4B, in which similar numerals are used to illustrate like parts in those figures. The small drive pulley 30 is rigidly mounted to the motor output shaft 25 and is rotated therewith in the direction of the arrow as shown. The belt 31 is trained to the small drive pulley. The large drive pulley 28 is divided into the two disk members 70 and 71 to define the belt groove. A washer 76 of leaf spring is mounted to the motor output shaft 25 at the above of the small drive pulley 30 and has a hole 77 to receive the shaft 25 passing therethrough. The disk member 70 is also provided with a central hole 72 to receive the shaft 25 and is rotatably supported thereby. The disk member 70 includes the flange 29 at the periphery thereof. The disk member 71 has the central hole 73 to receive the output shaft 25 and is mounted thereto in a manner that the disk members 70 and 71 abut against each other by means of a screw 75 threaded into a sleeve 74 on the disk member 71. The disk member 70 is frictionally connected to the disk member 71 by the bias of the washer 76 interposed between the small drive pulley 30 and the disk member 70. Thus, as the output shaft 25 is rotated, the disk member 70 is normally rotated with the small drive pulley 30, the disk member 71. The belt 31 is upwardly moved by the shift means to engage the flange 29 with the belt 31 and the disk member 70 is skidd on the disk member 71 to reduce the impact applied to the belt 31. This will prevent tear, damage of the belt derived from engagement of the flange 29.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. A tape drive speed changing apparatus for a magnetic tape player including a tape reproducing circuit, and a tape drive device for driving a tape, comprising:

a motor as drive source for said tape drive device, said motor allowing its output shaft to selectively rotate at low or high speed;

a changing switch for changing rotation of said output shaft of said motor from low to high speed and vice versa, said changing switch being normally in the condition that said output shaft is rotated at low speed;

large and small drive pulleys connected to said output shaft and arranged adjacent to each other, said large drive pulley having a flange at the periphery thereof;

a capstan in said tape drive device rotatably provided to extend upwardly of said player deck, said capstan carrying a flywheel attached thereto;

a belt normally trained between said small drive pulley and said flywheel to impart rotation of said output shaft to said capstan, said capstan being rotated at low speed while said magnetic tape being rotated at normal speed when said belt is normally trained between said small drive capstan and said flywheel;

shift means for moving said belt to the position where the belt is shifted from the small drive pulley to the large drive pulley, said belt being controlled by said flange of said large drive pulley and shifted from said small drive pulley to said large drive pulley in response to movement of said belt made by said shift means;

lock means for locking said shift means in the condition that said belt is moved to the position where said belt is trained to said large drive pulley, said changing switch being actuated by said shift means locked by said lock means to change rotation of said output shaft to high speed, during the time that said lock means locks said shift means said output shaft being rotated at high speed while said belt is trained between said large drive pulley and said flywheel, said magnetic tape being fast-fed;

a control means for controlling operation of said lock means, in response to nonoperative position in which said lock means is brought by said control means, said shift means being returned to its original position at the same time said belt is shifted from said large drive pulley to said small drive pulley, on the other hand the drive speed of said magnetic tape being changed from fast speed to the normal playing speed.

2. A tape drive speed changing apparatus for a magnetic tape player in accordance with claim 1, wherein said shift means includes an actuating member, an operating lever coupled to said member and manually operated, and a spring biasing said lever in one direction, said actuating member and said operating lever being swingably supported at one point, said operating lever being manually swung against the bias of said spring said belt being moved through said actuating member to the position where said belt is shifted from said small drive pulley to said large drive pulley.

3. A tape drive speed changing apparatus for a magnetic tape player in accordance with claim 2, wherein said motor includes governor contacts operative to be opened and closed in relation to rotation of said output shaft to control the current supply to said motor to rotate said output shaft at a predetermined low standard speed, said changing switch being connected in parallel with said governor contacts and said changing switch being actuated and closed by said operating lever for said shift means so that said governor contacts are shorted to rotate said output shaft at high speed.

4. A tape drive speed changing apparatus for a magnetic tape player in accordance with claim 2, wherein said lock means is an electromagnet magnetically attracting and locking said operating lever manually operated against the bias of said spring.

5. A tape drive speed changing apparatus for a magnetic tape player in accordance with claim 4, wherein said control means includes a control circuit which energizes said electromagnet in response to the reproducing signal of said reproducing circuit generated when the recorded zone on said magnetic tape passes through said magnetic head, and which deenergizes said electromagnet in response to the absence of the reproducing signal of said reproducing circuit when the nonrecorded zone on said magnetic tape passes through said magnetic head.

6. A tape drive speed changing apparatus for a magnetic tape player in accordance with claim 1, wherein said large drive pulley comprises a first disk member rotatably mounted to said output shaft, and a second disk member fixed to said output shaft in stack to said first disk member, said first disk member having said flange at the periphery thereof and a pin on its face in opposition to said second disk member, said second disk member being provided with an arc-shaped slot to receive said pin on said first disk member, said first disk member rotatable with respect to said second disk member within the range that said first disk member is controlled by said pin and said slot, said first and second disk members being coupled to each other by a spring interposed between said pin projecting through said slot from said second disk member and said second disk member.

7. A tape drive speed changing apparatus for a magnetic tape player in accordance with claim 1, wherein said large drive pulley comprises a first disk member rotatably mounted to said output shaft, and a second disk member fixed to said output shaft in stack to said first disk member, said first disk member having said flange at the periphery thereof, said first disk member being frictionally connected to said second disk member by a washer between said small drive pulley fixed to said output shaft and said first disk member and insertably mounted to said output shaft.

* * * * *